Patented Aug. 7, 1945

2,380,999

UNITED STATES PATENT OFFICE 2,380,999

PREPARATION OF ORGANOSILICON HALIDES

Murray M. Sprung, Scotia, and William F. Gilliam, Schenectady, N. Y., assignors to General Electric Company, a corporation of New York No Drawing. Application March 4, 1942, Serial No. 433,293

9 Claims. (Cl. 260—607)

The present invention relates to the preparation of organosilicon halides. It is particularly concerned with the preparation of organosilicon halides by effecting reaction between hydrocarbon halides and heated silicon in the presence of an inert atmosphere.

In the copending application of Eugene G. Rochow, Serial No. 412,459, filed September 26, 1941, and assigned to the same assignee as the present invention, is disclosed and broadly claimed the method of preparing organosilicon halides, more particularly hydrocarbon-substituted silicon halides which comprises bringing a hydrocarbon halide into contact with heated silicon.

The present invention is based on our discovery that if the hydrocarbon halide in vapor form is brought into contact with the heated silicon in the presence of, i. e., mixed with, an inert gas such as nitrogen and the reaction between the silicon and the hydrocarbon halide component of the gas mixture otherwise allowed to proceed in accordance with the teachings of the above-mentioned Rochow application, certain unexpected results are obtained. The use of an inert gas in this manner permits better control of the reaction and minimizes the formation of undesired byproducts. In general, at a given temperature, better yields of hydrocarbon-substituted silicon halides, such as the di(hydrocarbon-substituted) silicon halides $R_2SiX_2$ wherein R is a hydrocarbon radical and X is a halogen atom, are obtained from the reaction between a hydrocarbon halide RX and silicon when the reaction is carried out in the presence of an inert diluent. This desirable result is usually accompanied by a decrease in the amount of low-boiling reaction products, such as the chlorosilanes, $SiHCl_3$ and $SiCl_4$, etc., formed during the reaction. In some instances, an increase in the amount of unreacted hydrocarbon halide present in the condensed reaction products may be noted, but as this unreacted material can be recovered and again brought into contact with the silicon, a general increase in the overall efficiency of the process results from the use of an inert gas.

The inert gas, such as nitrogen, may be mixed with a hydrocarbon halide which is in the vapor state or it may be passed over, or bubbled through, a reservoir of a liquid hydrocarbon halide held at any desired temperature. With many of the hydrocarbon halides, this latter method, in which the nitrogen also functions as a carrier for the reactive hydrocarbon halide vapor, is preferred since the rate of flow of the gaseous mixture through the apparatus can be controlled by regulating the rate of flow of nitrogen into the reservoir while the amount of the reactive hydrocarbon halide carried into contact with the heated silicon by the inert gas can be controlled by varying the temperature of the hydrocarbon halide reservoir, i. e., the vapor pressure of the hydrocarbon halide. Although the inert gas may be mixed with the halide reactant in all proportions, best results are obtained when the inert gas comprises at least 25 per cent, preferably 50 per cent, of the gas mixture.

In order that those skilled in the art better may understand how the present invention may be carried into effect, the following illustrative examples thereof are given:

Example 1

(A) A quartz reaction tube was filled with a solid, porous silicon-copper contact mass prepared from a mixture of 90 parts silicon and 10 parts copper powders, pressed into pellets and sintered in hydrogen at 1050° C. for 1 hour. These contact masses and their preparation are more fully described and claimed in the copending application of Winton I. Patnode, Serial No. 412,461, filed September 26, 1941, and assigned to the same assignee as the present invention. The preparation of organosilicon halides utilizing solid, porous contact masses of this type is disclosed and claimed in the copending application of Eugene G. Rochow and Winton I. Patnode, Serial No. 412,460, filed September 26, 1941, and assigned to the same assignee as the present invention. The tube was heated to a temperature of 300° C. and methyl chloride was passed through the tube at a rate of 80 c. c. per minute for 17 hours. The effluent reaction products were passed through a trap cooled by a mixture of dry ice and acetone. After the condensate collected in the trap was distilled to remove volatile materials boiling below 25° C., there was obtained 258 grams of a liquid boiling above 25° C. This higher-boiling portion was distilled using a precision fractioning column and was found to contain 73.5 per cent dimethyldichlorosilane $(CH_3)_2SiCl_2$, 9 per cent methyltrichlorosilane $CH_3SiCl_3$, about 6 per cent trimethylchlorosilane $(CH_3)_3SiCl$, and small amounts of other methylchlorosilanes.

(B) Using the same apparatus contact mass, and temperatures as were employed in part (A) of this example, a mixture of methyl chloride and dry, oxygen-free nitrogen was passed over the heated contact mass for 26 hours at the rate of 40 c. c. per minute of the former and 100 c. c. per minute of the latter. The condensate contained 207 grams of liquid boiling above 25° C. which, on fractional distillation, yielded 86.5 per cent dimethyldichlorosilane, 4.0 per cent methyltrichlorosilane, and small amounts of other methylchlorosilanes. Thus the use of the inert diluent resulted in an increase of about 13 per cent in the yield of the dimethyldichlorosilane. The reason for this surprising increase in the relative proportion of the dimethyldichloro product obtained by utilization of an inert atmosphere is not clearly understood. It may be due to a shift in the complicated chemical equilibria set up during the process of synthesis or, more simply, it may be due to the prevention of local overheating. In this connection it may logically be assumed that the formation of a symmetrical alkylhalogenosilane such as dimethyl dichlorosilane from methyl chloride and silicon may most simply be represented by the equation:

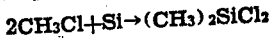

and that the formation of the other hydrocarbon silicon chlorides such as the mono- and trimethyl silicon chlorides $CH_3SiCl_3$ and $(CH_3)_3SiCl$, and the halogenated silanes such as $SiHCl_3$, $SiH_2Cl_2$, and $SiCl_4$ results from what may be looked upon as side reactions occurring concommitantly with an actual breaking up of the methyl radical of the methyl chloride. On this basis the presence of an inert atmosphere apparently favors the formation of the symmetrical product and retards or checks all or some of the side reactions.

In the following example the inert gas functions not only as a means for controlling the hydrocarbon halidesilicon reaction but also as a carrier for the hydrocarbon halide vapor.

*Example II*

Dry-oxygen-free nitrogen gas was bubbled through a reservoir of ethylene chloride at the rate of 300 c. c. per minute and then passed into a reaction tube filled with the same contact mass as was used in Example I. The temperature of the ethylene chloride was maintained at a temperature of 25°–27° C. with the result that the flow of nitrogen carried ethylene chloride vapors into the reaction tube at the rate of 0.5 gm. per minute. When the silicon-copper contact mass was heated to a temperature of 370–80° C. a rapid reaction took place with very little localized overheating or carbonization of the contact mass. The high-boiling silicon compounds recovered from the condensed reaction products by condensation in a trap cooled by an ice-water mixture contained a considerable quantity of 1,2 bis(trichlorosilyl) ethane. This and related compounds and their preparation are more fully described and claimed in the copending application of Winton I. Patnode and Robert W. Schiessler, Serial No. 433,328, filed concurrently herewith and assigned to the same assignee as the present invention.

It is to be understood, of course, that our invention is not limited to reactions involving the specific hydrocarbon halides named in the above illustrative examples. Examples of hydrocarbon halides other than those specifically mentioned in the examples which may be reacted with silicon at an elevated temperature in the presence of an inert atmosphere with comparable results are the higher alkyl halides, e. g., ethyl chloride, ethyl bromide, propyl chloride, etc.; the aryl halides, e. g., phenyl chloride, and the hydrocarbon dihalides such as methylene chloride, ethylene bromide, etc.

Likewise, the reaction may be carried out in the presence of metallic catalysts for the reaction other than copper or in the absence of a catalytic metal.

The preferred reaction temperatures, i. e. the temperatures at which substantial yields of the desired organosilicon halides are obtained depend, in general, on the reactant or reactants, the particular catalyst (if any) used, and the specific reaction conditions employed. In general, the use of the inert gas permits the utilization of somewhat higher reaction temperatures than when such gas is not used.

Although nitrogen has been used in the above examples, it is to be understood that other inert gases, i. e. gases that do not react appreciably either with the silicon or the hydrocarbon halide under the conditions employed, may be substituted for the nitrogen. Argon, helium, methane, are suitable substitutes. Nitrogen, because of its availability, is preferred.

What we claim as new and desire to secure by Letters Patent of the United States is:

1. The method which comprises effecting reaction at an elevated temperature between silicon and a halogenated hydrocarbon in the presence of an inert gas.

2. The method which comprises effecting reaction at an elevated temperature between silicon and the alkyl halide component of a mixture comprising an inert gas and an alkyl halide in the presence of a metallic catalyst.

3. The method which comprises effecting reaction between the hydrocarbon halide component of a mixture comprising nitrogen and a hydrocarbon halide and heated silicon in the presence of a copper catalyst for the reaction.

4. The method which comprises effecting reaction between the halogenated hydrocarbon component of a mixture comprising nitrogen and a halogenated hydrocarbon and silicon in the presence of a metallic catalyst at an elevated temperature.

5. The method which comprises effecting reaction between heated silicon and an alkyl halide in the presence of nitrogen.

6. The method which comprises effecting reaction between heated silicon and the methyl chloride component of a mixture of nitrogen and methyl chloride.

7. The method which comprises effecting reaction between silicon and the alkyl halide constituent of a mixture of nitrogen and an alkyl halide selected from the group consisting of alkyl chlorides and bromides, the said reaction being carried out at an elevated temperature in the presence of a copper catalyst.

8. The method of increasing the proportion of dimethyldichlorosilane resulting from the reaction of methyl chloride with heated silicon, which comprises introducing nitrogen into the methyl chloride prior to the reaction thereof with the silicon.

9. The method which comprises passing nitrogen through a reservoir of a liquid hydrocarbon halide, adjusting the temperature of said reservoir to obtain the desired ratio of nitrogen to hydrocarbon halide in the effluent gas mixture, passing said mixture over heated silicon and condensing the higher boiling products of reaction of the hydrocarbon halide and silicon.

MURRAY M. SPRUNG.
WILLIAM F. GILLIAM.